(12) United States Patent
Chenier (10) Patent No.: US 10,925,425 B2
(45) Date of Patent: Feb. 23, 2021

(54) SECURE OUTDOOR STORAGE AND DELIVERY CONTAINER

(71) Applicant: Andre Lamont Chenier, Tomball, TX (US)

(72) Inventor: Andre Lamont Chenier, Tomball, TX (US)

( * ) Notice: Subject to any disclaimer, the term of this patent is extended or adjusted under 35 U.S.C. 154(b) by 0 days.

(21) Appl. No.: 16/569,266

(22) Filed: Sep. 12, 2019

(65) Prior Publication Data

US 2020/0077826 A1 Mar. 12, 2020

Related U.S. Application Data

(60) Provisional application No. 62/730,394, filed on Sep. 12, 2018.

(51) Int. Cl.
*A47G 29/14* (2006.01)
*G07C 9/00* (2020.01)
*H04W 88/02* (2009.01)

(52) U.S. Cl.
CPC ....... *A47G 29/141* (2013.01); *G07C 9/00309* (2013.01); *G07C 9/00571* (2013.01); *G07C 9/00896* (2013.01); *A47G 2029/145* (2013.01); *A47G 2029/147* (2013.01); *A47G 2029/149* (2013.01); *G07C 2009/0092* (2013.01); *H04W 88/02* (2013.01)

(58) Field of Classification Search
CPC ............ G07C 9/00309; G07C 9/00571; G07C 9/00896; G07C 2009/0092; A47G 29/141; A47G 2029/145; A47G 2029/147; A47G 2029/149; A47G 2029/144; A47G 2029/142; H04W 88/02
USPC ........................................................ 340/5.73
See application file for complete search history.

(56) References Cited

U.S. PATENT DOCUMENTS

| | | | | |
|---|---|---|---|---|
| 5,774,053 A | * | 6/1998 | Porter | A47G 29/141 232/19 |
| 5,979,750 A | * | 11/1999 | Kindell | A47G 29/141 232/1 R |
| 2001/0050615 A1 | * | 12/2001 | Kucharczyk | A47G 29/141 340/568.1 |
| 2002/0014953 A1 | * | 2/2002 | Stephens | G07C 9/00571 340/5.61 |
| 2004/0010706 A1 | * | 1/2004 | Stevens | G07C 9/00912 726/4 |
| 2007/0193834 A1 | * | 8/2007 | Pai | G06Q 10/08 186/3 |
| 2009/0166403 A1 | * | 7/2009 | Volpe | A47G 29/141 235/375 |
| 2009/0201198 A1 | * | 8/2009 | Moudy | G06Q 10/087 342/357.75 |
| 2015/0235172 A1 | * | 8/2015 | Hall | G06Q 10/0833 705/333 |

(Continued)

*Primary Examiner* — Edwin C Holloway, III (57) ABSTRACT

A protective storage system comprising: i) a container configured to receive and hold a delivered item; ii) a lid coupled to the container and configured to cover an opening of the container; and ii) a base on which the container is securely mounted. The base is configured to be securely connected to a structure. The protective storage system further comprises iv) a temperature control system for heating or cooling the delivered item; and v) a control module for controlling the opening and closing of the lid and for providing a user remote access and control capabilities.

10 Claims, 4 Drawing Sheets

(56) References Cited

U.S. PATENT DOCUMENTS

2016/0140496 A1* 5/2016 Simms ................. B64C 39/024
                                                      705/337
2017/0213187 A1* 7/2017 Choi .................... A47G 29/141
2019/0210772 A1* 7/2019 Byrne ...................... E05G 1/08

* cited by examiner

SECURE OUTDOOR STORAGE AND DELIVERY CONTAINER

CROSS-REFERENCE TO RELATED APPLICATION(S) AND CLAIM OF PRIORITY

The present application is related to U.S. Provisional Patent No. 62/730,394, filed Sep. 12, 2018 and entitled "SECURE OUTDOOR STORAGE AND DELIVERY CONTAINER". Provisional Patent No. 62/730,394 is assigned to the assignee of the present application and is hereby incorporated by reference into the present application as if fully set forth herein. The present application hereby claims priority under 35 U.S.C. § 119(e) to U.S. Provisional Patent Ser. No. 62/730,394.

TECHNICAL FIELD

The present application relates generally to storage containers and, more specifically, to a delivery and storage container that functions as a reinforced safe, an oven, and a refrigerator.

BACKGROUND

Online shopping continues to grow as consumers become accustomed to the convenience and speed of home delivery of purchased items. It is much easier to find products in an online store than in a bricks-and-mortar store and online shopping eliminates the time and inconvenience of traveling to a physical store. However, these improvements are not without drawbacks.

The delivery of clothes, electronics, groceries and more to millions of homes every day has resulted in an explosion of package thefts from the front doors of homes. Package theft and claims that delivered goods were "damaged during shipping" or "not delivered" plague the business of home delivery. Quite often, goods are damaged during shipping because they require heating or refrigeration, but were left on a porch for hours without any protection from the elements. This costs merchants and consumers hundreds of millions of dollars per year.

SUMMARY

To address the above-discussed deficiencies of the prior art, it is a primary object to provide a protective storage system comprising: i) a container configured to receive and hold a delivered item; ii) a lid coupled to the container and configured to cover an opening of the container; and ii) a base on which the container is securely mounted, the base configured to be securely connected to a structure. The protective storage system further comprises iv) a temperature control system for heating or cooling the delivered item; and v) a control module for controlling the opening and closing of the lid and for providing a user remote access and control capabilities.

In one embodiment, the control module is configured to communicate with a wireless mobile device associated with the user.

In another embodiment, the protective storage system further comprises a first camera configured to send to the wireless mobile device at least one of an image or a video stream of an area exterior to the protective storage system.

In still another embodiment, the protective storage system further comprises a second camera configured to send to the wireless mobile device at least one of an image or a video stream of an interior of the protective storage system.

In yet another embodiment, the protective storage system further comprises an intercom configured to transmit an audio stream between the protective storage system and the wireless mobile device.

In a further embodiment, the protective storage system further comprises a sensor configured to detect the presence of a person in proximity to the protective storage system.

In a still further embodiment, the protective storage system further comprises an intercom configured to transmit an audio stream between the protective storage system and the wireless mobile device.

In a yet further embodiment, the protective storage system further comprises a locking mechanism for maintaining the lid in a closed position on the container.

In one embodiment, the control module is configured to open and close the locking mechanism.

In another embodiment, the protective storage system further comprises a scale disposed in the interior of the container.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged protective storage system.

The present disclosure describes a protective storage system that provides increased freedom, flexibility, and convenience to consumers who order products, including food or groceries, for delivery. A delivery person places the delivered products into the protective storage system and the protective storage system keeps its contents safe from theft, vandals, and animals, protected from weather, and maintains a warm or cool temperature until the consumer is able to remove the delivered products from the protective storage system.

The disclosed protective storage system functions as a heavy-duty safe, an oven, a refrigerator, and a remotely accessible security system. The protective storage system is bolted to a concrete foundation or a wooden deck on the exterior of a building or other structure. The protective storage system is waterproof, comprises one or more wireless transceivers (e.g., WiFi and/or Bluetooth transceivers), and radio-frequency identification (RFID) technology (e.g., RFID tags, RFID chips). The protective storage system comprises actuators that automate the opening and closing of the lid of the protective storage system. Cameras, motion sensors, proximity sensors, microphones and speakers embedded in the protective storage system or in the exterior wall of the building enable the protective storage system to detect a person in proximity to the protective storage system and to communicate with the detected person. The disclosed protective storage system device the objects within it safe from theft harsh weather conditions and spoilage.

Figure 1:
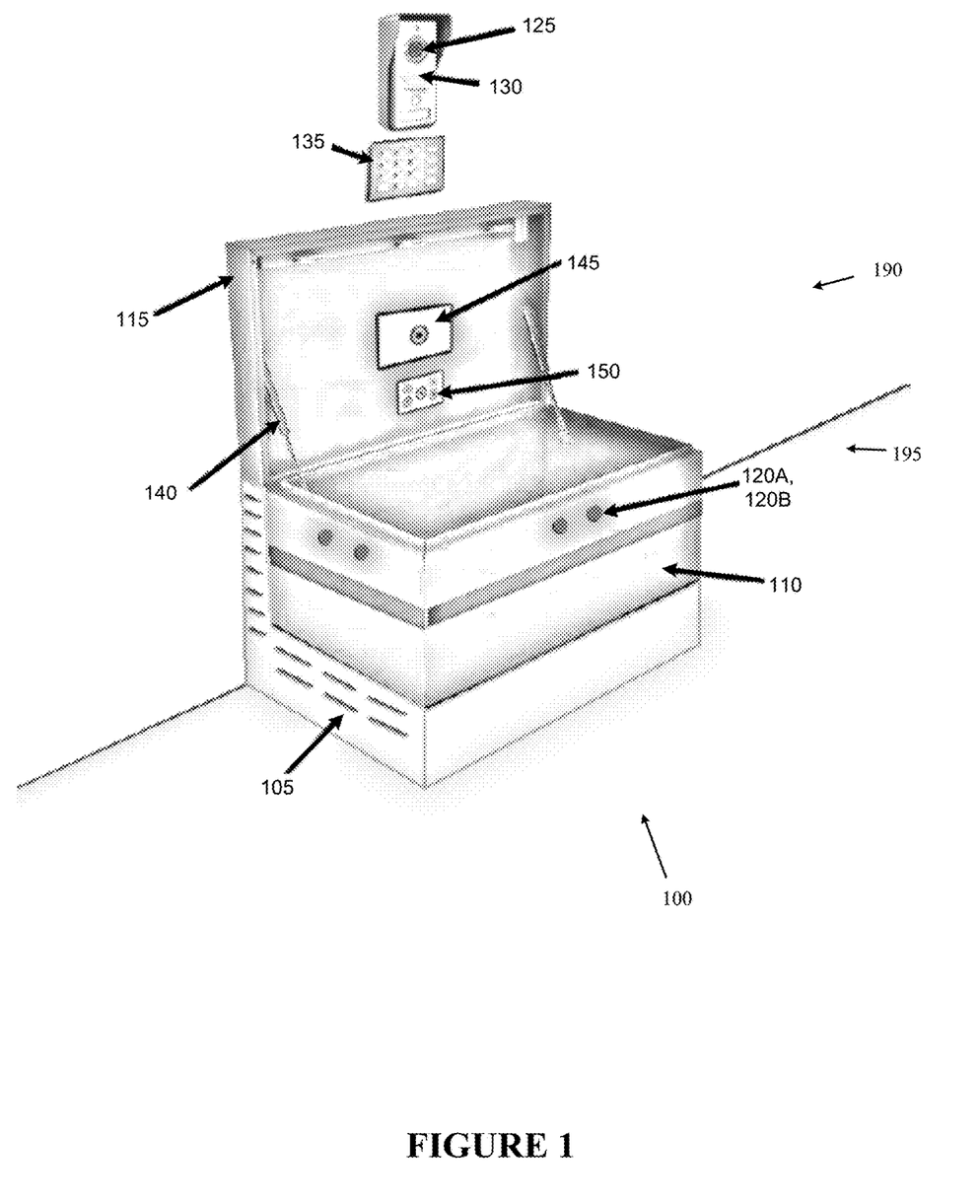
FIG. 1 illustrates a protective storage system according to one embodiment of the disclosure.

FIG. 1 illustrates protective storage system 100 according to one embodiment of the disclosure. Protective storage system 100 is shown mounted on floor 195 and against wall 190. In an exemplary embodiment, floor 195 is a concrete slab or a wooden deck abutting the exterior of a residence and wall 190 is an exterior wall of the residence. Protective storage system 100 may be positioned proximate the front wall 190 of the residence and facing a street to provide easier access to a deliveryman. However, this is by way of illustration only. In alternate embodiments, protective storage system 100 may be positioned on a rear wall 190 or sidewall 190 of the residence for greater secrecy.

Protective storage system 100 comprises base 105, container 110 mounted on base 105, and lid 115 attached to container 110. For enhanced security, container 110 is securely mounted on base 105 to prevent container 110 from being separated from base 105 except by the owner of protective storage system 100. By way of example, container 110 may be bolted to base 105 by means of bolts that are only accessible from the interior of container 110. In order to access the bolts, lid 115 must be opened, which can only be done by the owner/user of protective storage system 100 or someone who have been give an access code to open lid 115.

Protective storage system 100 further comprises proximity sensor 120A and motion sensor 120B, which may be mounted on an exterior face of container 100 and face the street in order to detect a deliveryman or other person approaching protective storage system 100. Protective storage system 100 further comprises internal video camera 145, internal sensor module 150, and a scale (not shown) disposed inside protective storage system 100. Internal sensor module 150 may include a plurality of sensors, including, for example, internal motion sensor 150, accelerometer module 150B, temperature sensor 150C, and the like. In an advantageous embodiment, internal video camera 145 and internal sensor module 150 may be mounted on an inner surface of lid 115. When lid 115 is closed, internal video camera 145 and internal motion sensor 150A may detect the presence of objects in protective storage system 100, including a child or animal that may accidentally become trapped in protective storage system 100.

Protective storage system 100 further comprises actuator 140, which may automatically raise and lower lid 115 under the control of a processor or control module (not shown) associated with protective storage system 100. Protective storage system 100 further comprises external video camera 125, external two-way intercom 130, and keypad 135. External two-way intercom 130 may also function as a siren 130 if an alarm must be triggered. When a delivery or pickup is in progress, the delivery person approaches protective storage system 100 and one or both of proximity sensor 120A and motion sensor 120B detects the delivery person and triggers external camera 125 to start recording the interaction.

In some embodiments, external video camera 125, external two-way intercom 130, and keypad 135 may be mounted on wall 190 of the residence and communicate with the control module (not shown) by means of a wireline or a by means of a wireless link. In an alternate embodiment, base 105 may extend upward along wall 190 above the top of lid 115 and external camera 125, external two-way intercom 130, and keypad 135 may be mounted on the portion of base 105 that extends above the top of lid 115. Similarly, sensors 120A and 120B may be mounted on wall 190 proximate camera 125 instead of on the front face of container 110.

For simplicity of explanation, FIG. 1 does not show the power lines and cables that provide power to the components of protective storage system 100. Likewise, FIG. 1 omits signal lines and data buses that may interconnect the cameras, intercoms, sensors, actuators, and other electronics of protective storage system 100. However, those of ordinary skill in the art will readily understand how to implement power lines, signal wires and data buses using any one of a large number of wiring topologies that are well known in the art.

Figure 2:
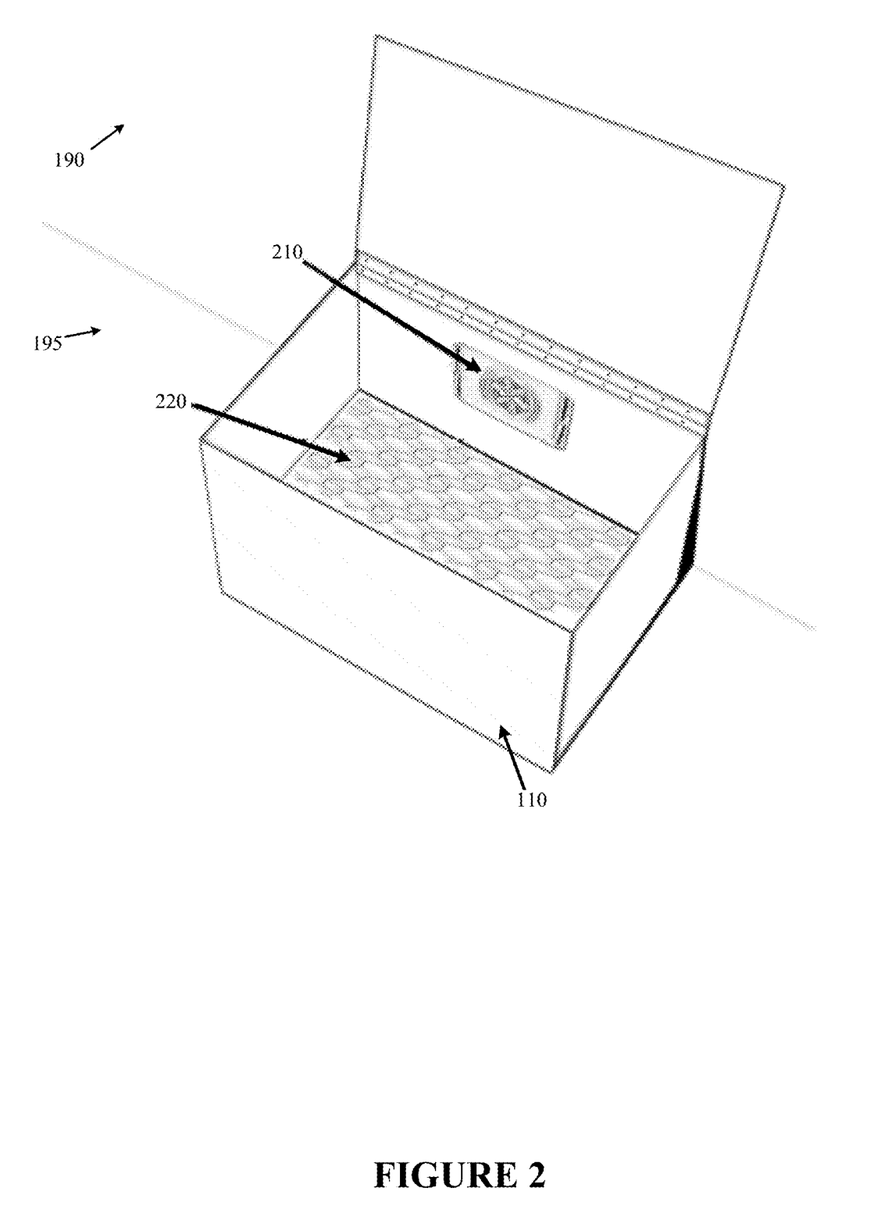
FIG. 2 illustrates a container of the protective storage system according to one embodiment of the disclosure.

FIG. 2 illustrates container 110 of protective storage system 100 according to one embodiment of the disclosure. Container 110 comprises heating element 210, which includes a circulating fan. Container 110 also comprises scale 220. Heating element 210 and the circulating fan provide heated air that circulates around the contents of container 110, thereby heating the contents to a desired temperature. This enables a user to order food for delivery. When the food is delivered, container 110 keeps the food warm until the user removes the delivered food from container 110.

Figure 3:
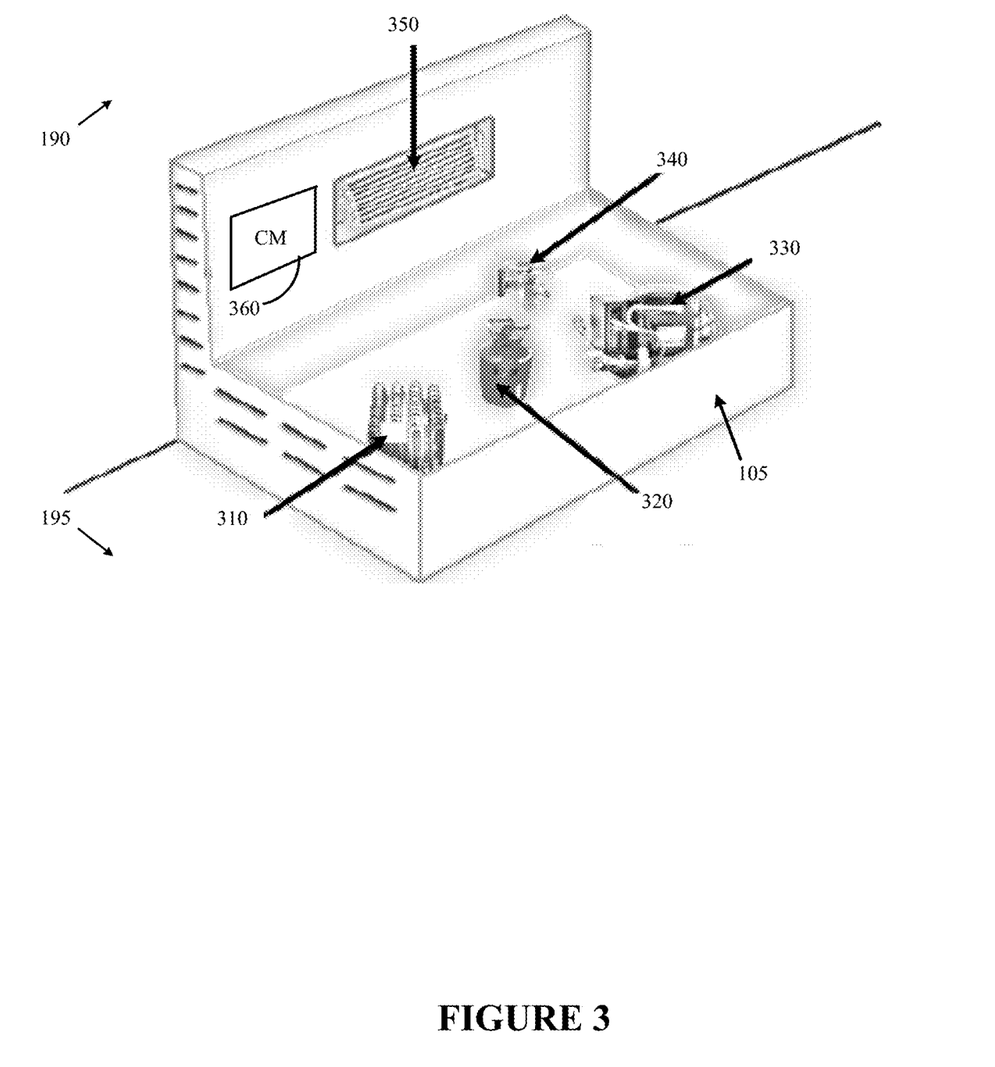
FIG. 3 illustrates a base of the protective storage system according to one embodiment of the disclosure.

FIG. 3 illustrates base 105 of protective storage system 100 according to one embodiment of the disclosure. Base 105 comprises a refrigeration system that includes condenser coils 310, fluid refrigerant 320, compressor 330, expansion device 340, and evaporator coils 350. The refrigeration system lowers the temperature inside container 110, thereby cooling the contents to a desired temperature. For simplicity of explanation, FIG. 3 does not show the interconnecting tubing and control electronics of the refrigeration system. The refrigeration system is useful for deliveries that may be kept cool, such as meat, fish, dairy products, medicines, flowers, cakes, and the like.

In an exemplary embodiment, container 110 further includes control module (CM) 360, which may comprise a microprocessor (μP) (or a microcontroller) and a memory (e.g., DRAM, Flash memory, etc.). The microprocessor executes control software stored in the memory to control the overall operation of protective storage system. Control module 360 may include a wireless transceiver module, such as a system-on-a-chip (SoC) that includes a WiFi transceiver (X-CVR), a Bluetooth transceiver (X-CVR), and/or an RFID tag.

Figure 4:
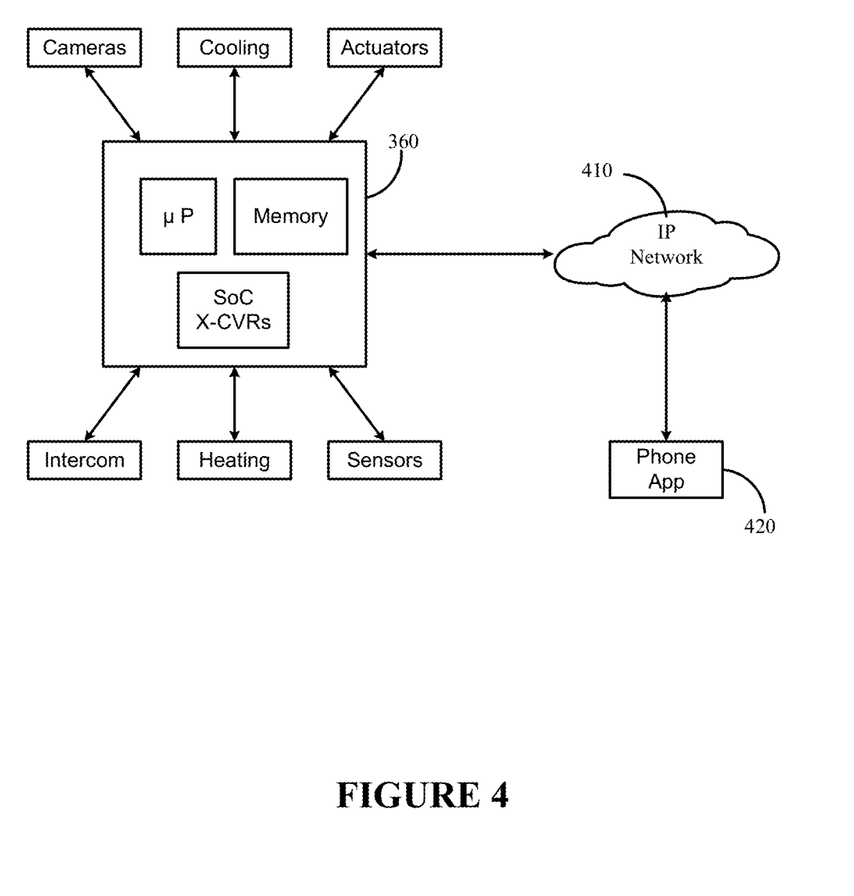
FIG. 4 is a diagram illustrating an operation of the protective storage system according to an embodiment of the disclosure.

FIG. 4 is a diagram illustrating an operation of protective storage system 100 according to an embodiment of the disclosure. As noted above, control module 360 controls the overall operation of protective storage system 100. CM 360 is configured to communicate either wirelessly or by wireline with the cameras (125, 145), sensors (150, 120A, 120B), actuators 140, intercom 130, keypad 135, cooling elements system (310, 320, 330, 340, 350), heating elements (210), and scale 220. CM 360 is also configured to communicate with a phone application 420 that may be controlled by the owner of protective storage system 100. CM 360 and phone app 420 may communicate directly, such as via WiFi or Bluetooth transmissions. CM 360 and phone app 420 may also communicate remotely, such as via IP network 410, which may include cellular communications and intermediate WiFi and/or Bluetooth transmissions.

To prevent the lid 115 of container 110 from opening or closing while a person or animal is in close proximity, CM 360 uses proximity sensor 120A and motion sensor 120B on its front, left and/or right profiles to detect a person or animal. The sensors detect if there is movement and the proximity of that movement with respect to the location of container 110. CM 360 calculates the location of the movement and the speed at which the movement is approaching the container and may either not allow lid 115 to open or close (if the target is too close) or may pause the opening or closing process if the target has entered into the restricted area too fast. After the person or animal has exited the restricted zone around container 110, CM 360 may command actuators 140 to commence with opening or closing lid 115.

To ensure that a person or animal does not become trapped inside of container 110 when lid 115 is closed, CM 360 monitors motion sensor 150A, video camera 145, and scale 220 inside of container 110. CM 360 is configured to recognize the weight of empty container 110. When any amount of weight above a predetermined threshold is added to container 360, CM 360 compares that additional weight to the anticipated weight of a delivered product and determines if the object added to container 110 is supposed to be inside of container 110. If the newly inserted object is too heavy or if CM 360 deems the object suspicious, CM 360 may send an alert message to phone app 420 with a link to photos of the inside of container 110, a video of the delivery interacting with container 110, and detailed data analytics of the transaction (i.e., delivery/pick-up).

In response, the user of phone app 420 may push a button on the phone screen that remotely opens lid 115 to free the person or animal. The user may also have the option to configure CM 360 to open lid 115 automatically when this type of scenario occurs—even before an alert notification is sent to phone app 420. This option will help the person or animal faster because it does not wait for a decision from the user of phone app 420. This may be the case if the user does not choose to interact with phone 420 immediately. In such an automatic opening configuration, when the user does choose to interact with phone app 420, the user may view the photos, videos and data to determine if the alert was a false alarm and then push a button on the phone screen that will close lid 115.

When a delivery person puts a package into container 110, internal camera 145 takes a photo of the package and scale 220 weighs the package. External camera 125 records the delivery person leaving the vicinity of container 110. CM 360 records the time and date that the package was delivered, the code that was entered to gain access to container 110, the merchant/shipper that was assigned the code, and the expected company name of the merchant. Then CM 360 compares the recorded weight of the package to the expected weight given by from the data received from the merchant/shipper, and records the new weight of the total contents of container 110.

CM 360 may send all of the data to a cloud server (not shown) via IP network 410 for reference if the data is needed to investigate a "no package received" claim, a "package not picked up" claim, or a "package theft" evidentiary investigation. CM 360 may then send the photo of the contents of container 110 along with the date and time of the delivery to the smart device of the user. Data and video footage need not be sent to the user, merchant or law enforcement for a successful transaction (i.e., correct delivery/pickup). The data and video footage is accessible to the user, merchant and law enforcement when there is an unsuccessful transaction (i.e., a flawed delivery/pickup, theft, or suspicious activity).

External 2-way intercom 130 and video camera 125 mounted above container 110 allow the user using phone app 420 to see the area in front of and on both sides of container 110. CM 360 is configured to transfer video and audio between phone app 420 and intercom 130 and video camera 125 so that the user may be able to see and to speak with the delivery person about delivery details and/or give special instructions. Intercom 130 and camera 125 are also able to record video and audio footage of any theft or suspicious activity in the immediate area of container 110. All video and audio data are saved in the cloud server for future review and as evidence for law enforcement.

CM 360 may monitor one or more accelerometer sensors 150B associated with sensor module 150. Accelerometer sensors 150B detect if container 110 is jarred or is forced open with a prying object. If either of these situations occur, CM 360 sounds an audible alarm via siren 130 in intercom 130, and may verbally tell the prospective intruder that the intruder is being recorded. CM 360 also may send a notification to phone app 420 with photos of the inside of container 110 and video of the outside area around container 110. The user is able to see the thief and speak to the thief via two-way intercom 130. CM 360 also sends photos, video, data analytics, and the location (i.e., address of GPS data) of container 110 to the cloud server, so that it is readily available to law enforcement as evidence for an investigation.

CM 360 monitors scale 220 and keeps track of the weight of the contents of container 110. This function helps determine when items are placed in, or removed from, container 110. This prevents a rogue delivery person from using an approved code to open container 110 to deliver or pickup an item, but also remove that item or any existing item from container 110. CM 360 uses the recorded weight of the contents before the access code is entered and adds the expected weight of the delivered package. When CM 360 issues the command to close lid 115, scale 220 weighs contents again. If the weight is less than the sum of the pre-delivery weight and the expected package weight should be, them CM 360 determines that the delivery person removed an item from container 110 when he or she used the access code for entry. In this scenario, CM 360 sends a photo of the contents of container 110, video of the outside of container 110, the date and time, the merchant name, and expected delivery description to phone app 420. CM 360 also sends photos, videos, data analytics and the location of container 110 to the cloud server so that it is readily available to law enforcement as evidence for investigation.

CM 360 monitors temperature sensors 150C inside of container to measure the temperature of the inside of container 110. CM 360 includes a "smart temperature" control feature that allows the user to preselect the type of delivery that is expected and CM 360 will pre-heat/pre-cool container 110 to a sustainable temperature. After delivery, CM 360 will modulate the container 110 temperature to the optimal temperature for the delivered item. For example, if the delivered item is flowers, CM 360 may set container 110 to 70 degrees. If the delivered item is Chinese food, CM 360 may sent container 110 to 150 degrees. When the user removes delivered items from container 110, CM 360 may activate scale 220 to take a measurement of the weight of container 110. When CM 360 determines that container 110 is empty, CM 360 may turn off heating element 210 or the refrigeration system (310, 320, 330, 340, and 350) and the temperature will return to the ambient temperature of its surroundings.

In some embodiments, if a cold delivery is expected after a hot delivery has been delivered and removed by the user, CM 360 may take a temperature measurement of the inside of container 110 and may lid 115 to vent some of the hot air and then pre-cool container 110 in preparation for the cold delivery. If a hot delivery is expected after a cold delivery has been delivered and removed by the user, CM 360 may open lid 115 to vent some of the cold air and then pre-heat container 115 in preparation for the hot delivery.

When a user orders a product from a merchant or restaurant online, CM 360 may generate an encrypted access code. CM 360 forwards the access code to the delivery service. The delivery person has this access code at the time of the actual physical delivery and enters the code into keypad 135. CM 360 then grants access. The access code may be used only once. After it is used to gain access, the access code is no longer valid. CM 360 records when the code was generated, for whom the access code was generated, and the date and time the access code was entered into keypad 135. This information is important for tracking packages, determining if a package was not received, and for theft claim investigation. This access code process is the same for scheduled pickups initiated by the user.

CM 360 may lock lid 115 in a plurality of ways. In one embodiment, CM 360 may cause actuators 140 to close lid 115 and actively keep lid 115 closed by continually maintaining a closure force on lid 140. This means of locking lid 115 is simple and requires no further components. However, in an alternate embodiment CM 360 may lock lid 115 by a more conventional bolt or latch type of lock that may be electronically opened and closed. One part of the lock (i.e., the bolt) may be mounted on the inner edge of lid 115 and the other part of the lock that engages the bolt may be mounted on the inside of the top edge of container 110. This means of locking lid 115 will still operate even if power is cut to protective storage system 100.

CM 360 may have comprise an RFID chip reader. Lightweight or special deliveries may be tagged with a custom RFID chip. CM 360 reads and records the RFID chip. The RFID chip stores data about the product, such as weight, point of origin, price, value, and ownership. In some instances, scale 220 may be unable to accurately measure the weight of lightweight packages. Therefore, CM 360 uses the RFID chips to examine the delivery for identification, confirmation and notification services. The RFID chip reader is also useful for identifying the delivery of purposefully non-descript items, such as medicines, expensive merchandise, cash, credit cards, IRS correspondence, and identification documents. These types of deliveries are time and security sensitive and are packaged with RFID chips for security and privacy.

When a delivery/pickup is in progress, the delivery person approaches container 110 and CM 360 uses sensors 120 to detect the delivery person. In response, CM 360 commands external camera 125 to record the interaction. When a package is placed into container 110, internal camera 145 takes a photo of the package and the RFID chip reader scans the package and records the data. External camera 125 also records the delivery/pickup person leaving the area of container 110. CM 360 records the time and date that the package was delivered, the access code that was entered to gain access, the merchant/shipper that was assigned the access code, the data read from the RFID chip and the company name of expected shipper. CM 360 may transmit all of this data to a cloud server via IP network 410 for reference if it is needed to investigate a "no package received" claim, a "package not picked up" claim or a "package theft" evidentiary investigation.

CM 360 monitors proximity sensors 120A and motion sensors 120B to determine the movement intensity and distances of nearby objects. When CM 360 determines the object in question is a human (i.e., delivery person) and within a defined engagement zone, CM 360 may play an audible verbal greeting and audible instructions thru intercom 130. The delivery person is able to respond to CM 360 verbally if he chooses or may keypad 135 to respond.

The disclosed protective storage system provides a convenient, secure, home-based environment for accepting deliveries. This enables the safe delivery of a greater range of products to homes. Cash, temperature-sensitive prescription medicine, alcoholic beverages, and higher value merchandise are just a few products that may be delivered at a consumer's home without the consumer being there to receive it in person.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A protective storage system comprising:
a container configured to receive and to hold a delivered item;
a lid coupled to the container and configured to cover an opening of the container;
a base on which the container is securely mounted, the base configured to be securely connected to a structure;
a temperature control system for heating or cooling the delivered item; and
a control module disposed in the base and configured to control the opening and closing of the lid and provide a user remote access and control capabilities capability, wherein the control module comprises:
a radio-frequency identification (RFID) reader configured to read an RFID chip associated with the delivered item in response to the delivered item being placed in the container.

2. The protective storage system as set forth in claim 1, wherein the control module is configured to communicate with a wireless mobile device associated with the user.

3. The protective storage system as set forth in claim 2, further comprising a first camera configured to send to the wireless mobile device at least one of an image or a video stream of an area exterior to the protective storage system.

4. The protective storage system as set forth in claim 3, further comprising a second camera configured to send to the wireless mobile device at least one of an image or a video stream of an interior of the protective storage system.

5. The protective storage system as set forth in claim 2, further comprising an intercom configured to transmit an audio stream between the protective storage system and the wireless mobile device.

6. The protective storage system as set forth in claim 2, further comprising a sensor configured to detect the presence of a person in proximity to the protective storage system.

7. The protective storage system as set forth in claim 2, wherein the control module is configured to generate an access code and to transmit the access code to a delivery person, wherein the delivery person uses the access code to unlock the lid of the container.

8. The protective storage system as set forth in claim 2, further comprising a locking mechanism for maintaining the lid in a closed position on the container.

9. The protective storage system as set forth in claim 8, wherein the control module is configured to open and close the locking mechanism.

10. The protective storage system as set forth in claim 2, further comprising a scale disposed in the interior of the container.

* * * * *